US012564997B2

(12) United States Patent
Gardner et al.

(10) Patent No.: US 12,564,997 B2
(45) Date of Patent: Mar. 3, 2026

(54) METHOD OF MAKING A PROTECTIVE GLOVE

(71) Applicant: TECH 21 LICENSING LIMITED, Richmond (GB)

(72) Inventors: James Alexander Gardner, Richmond (GB); Haim Geva, Richmond (GB)

(73) Assignee: Tech 21 Licensing Limited, Twickenham (GB)

( * ) Notice: Subject to any disclaimer, the term of this patent is extended or adjusted under 35 U.S.C. 154(b) by 26 days.

(21) Appl. No.: 18/556,741

(22) PCT Filed: Apr. 7, 2022

(86) PCT No.: PCT/GB2022/050876
§ 371 (c)(1),
(2) Date: Oct. 23, 2023

(87) PCT Pub. No.: WO2022/223945
PCT Pub. Date: Oct. 27, 2022

(65) Prior Publication Data
US 2024/0215668 A1 Jul. 4, 2024

(30) Foreign Application Priority Data

Apr. 23, 2021 (GB) ...................................... 2105855

(51) Int. Cl.
*B29C 64/10* (2017.01)
*A41D 19/04* (2006.01)
(Continued)

(52) U.S. Cl.
CPC .............. *B29C 64/10* (2017.08); *A41D 19/04* (2013.01); *B29C 64/40* (2017.08); *B33Y 10/00* (2014.12); *A41D 19/01523* (2013.01)

(58) Field of Classification Search
CPC .............. A41D 19/04; A41D 19/01523; A41D 19/0055; A41D 19/0068; A41D 19/0058;
(Continued)

(56) References Cited

U.S. PATENT DOCUMENTS

| | | | | |
|---|---|---|---|---|
| 7,209,797 B2 * | 4/2007 | Kritchman | .............. | B33Y 10/00 |
| | | | | 700/98 |
| 7,229,670 B2 * | 6/2007 | Williams | ......... | A41D 19/01547 |
| | | | | 427/389.9 |

(Continued)

FOREIGN PATENT DOCUMENTS

| | | |
|---|---|---|
| CN | 112 244 398 | 1/2021 |
| CN | 112244398 A | 1/2021 |
| DE | 102016013371 | 5/2017 |

OTHER PUBLICATIONS

International Search Report dated Jun. 24, 2022 in International Application No. PCT/GB2022/050876.
(Continued)

*Primary Examiner* — Michael P Wieczorek
(74) *Attorney, Agent, or Firm* — HILL, KERTSCHER & WHARTON, LLP; Gregory T. Ourada

(57) ABSTRACT

A method for making a protective glove. The method comprises forming a glove body (2) from flexible material, with a front layer and a rear layer with an opening between the layers to allow access for the hand into an internal space within the glove. A last (3) is inserted into the glove body (2) to stretch the glove body and to hold the rear layer in the stretched form without creases. The glove and last are placed on a 3D printer bed (21), and 3D protection features (1) are printed onto the rear layer.

6 Claims, 9 Drawing Sheets

(51) Int. Cl.

| | | |
|---|---|---|
| *B29C 64/40* | (2017.01) | |
| *B33Y 10/00* | (2015.01) | |
| *A41D 19/015* | (2006.01) | |

(58) Field of Classification Search

CPC .......................... A41D 19/01547; B29C 64/20;
B29C 64/205; B29C 64/209; B29C
64/245; B29C 64/106; B29C 64/112;
B29C 64/10; B29C 64/40

See application file for complete search history.

(56) References Cited

U.S. PATENT DOCUMENTS

| | | | |
|---|---|---|---|
| 2015/0374051 A1 | 12/2015 | Rauckman et al. | |
| 2017/0055608 A1 | 3/2017 | Boorsma et al. | |
| 2019/0116900 A1 | 4/2019 | Northup et al. | |
| 2019/0223527 A1 | 7/2019 | George | |
| 2020/0390169 A1 | 12/2020 | Waterloo | |

OTHER PUBLICATIONS

Written Opinion dated Jun. 24, 2022 in International Application No. PCT/GB2022/050876.

European Search Report dated Sep. 16, 2021 in GB Application No. 2105855.7.

International Search Report dated Jun. 24, 2022 in International Application No. PCT/GB2022/050876 (in application file, previously submitted Oct. 23, 2023).

Written Opinion of the International Searching Authority (ISA) dated Jun. 24, 2022 in International Application No. PCT/GB2022/050876 (in application file, previously submitted Oct. 23, 2023).

European Search Report dated Sep. 16, 2021 in GB Application No. 2105855.7 (in application file, previously submitted Oct. 23, 2023.

* cited by examiner

METHOD OF MAKING A PROTECTIVE GLOVE

The present invention relates to a method of making a protective glove.

Protective gloves may be used, for example, by labourers or sportsmen in order to provide a degree of impact protection particularly to the back of the hand. Such gloves are traditionally made by creating a glove body by knitting or from separate pieces of fabric which are cut and sewn together. Protective features are formed separately by injection moulding and are then attached to the glove body by stitching or sewing.

This approach has a number of drawbacks. The stitching or gluing process is a largely manual process, and, as such, is labour intensive. Further, the protective features themselves cannot be particularly complex as they need to be of a relatively robust structure which can be moulded and then attached to the glove body.

US 2020/390169 discloses 3D printing on a glove held on a movable former. Formers have a complex 3D shape resembling a hand. US 2020/390169 does not describe how printing is carried out on a complex movable surface.

The present invention is aimed at improving on the prior art.

Accordingly to the present invention, there is provided a method according to claim 1.

The present invention automates the step of attaching the protective features, thereby reducing the cost of manufacture.

Further, the use of 3D printing, rather than injection moulding allows the protective features themselves to have a more complex design. This provides a number of benefits. The protective features can cover a wider area, thereby providing improved impact protection. At the same time, the gloves can be more flexible as the creation of the more complex shapes allow the features with enhanced flexibility to be produced in the vicinity of the finger joints. The better targeting of material allows the protective features to be lighter as the protection can be better distributed across the glove. This reduces weight and enhances the flexibility of the glove, thereby improving the comfort and further reducing manufacturing costs.

With the present invention, it is easier to create gaps within the protective features thereby improving the ventilation provided by the gloves.

Thus, the resulting glove can be lighter, more flexible and provide greater breathability than the existing gloves. This provides greater comfort and better impact protection for a user than the prior art gloves.

By holding the rear layer in a stretched form without creases, the last provides a well-defined surface on which the 3D printing can occur. This contrasts favourably with the complex movable 3D surface of US 2020/390169 which is not printed on a printer bed. Further, because the glove body is stretched, this has the effect of opening up the structure of the underlying material to provide enhanced bonding with the 3D printed protection features.

The last inserted into the glove may be a single piece. For example, the single piece may fill the finger and palm regions of the glove body to allow the protection features to be printed on this part of the body. Protection in the thumb region can then be formed in a conventional manner. Alternatively, the single piece last may include a main body and a thumb region which may be deformable with respect to the main body once it is inserted into the glove body. However, preferably, the last is provided in at least two parts, namely a thumb part insertable into a thumb portion of the glove body and a main part insertable into finger and palm portions of the glove body.

The last may be configured to hold the rear layer in a curved configuration. However, preferably, the last is configured to hold the rear layer in a planar configuration. This provides the most straightforward surface for 3D printing. The last may also stretch the front layer to be without creases. The last will rest on this surface during the 3D printing process, so this helps the stability of the last. It also allows the option of turning the over to allow features to be printed on the front layer.

Preferably the last has a peripheral face extending, in use, between the front and rear layers of the glove, the peripheral face having a groove to receive, in use, a seam on the glove. This allows the glove seam to be accommodated and helps the surface to be printed to remain crease free.

The sub-assembly of the last and glove body may be placed on the print bed of a 3D printer. Optical imaging can be used to determine the position of the glove body. However, preferably, a position reference feature is provided in order to locate the glove body and last in a pre-determined position within the 3D printer. This location feature may take the form of one or more stop features on the print bed or the last. However, preferably, a reference plate is provided, the reference plate being configured to receive the last in a predetermined position, the reference plate also being provided with at least one stop feature to locate the reference plate on the 3D printer print bed. In this arrangement, the last is provided with a plurality of mechanically interlocking features which are complimentary to mechanically interlocking features on the reference plate in order to locate the last on the reference plate. The last may additionally or alternatively be preferably provided with a plurality of magnetic features which are complimentary to magnetic features on the reference plate in order to locate the last on the reference plate.

Examples of the method according to the present invention will now be described with reference to the accompanying drawings, in which:

FIG. 11 is an exploded partial perspective view of the end of the last of FIG. 5 and the part of the reference plate that it engages with;

The method of the present invention is concerned with the manner in which protective features 1 are formed onto the glove body 2. The glove body 2 is formed in a conventional manner, and is, for example, knitted or formed of pieces of fabric which have been sewn together. This process will now be described further here.

Figure 1:
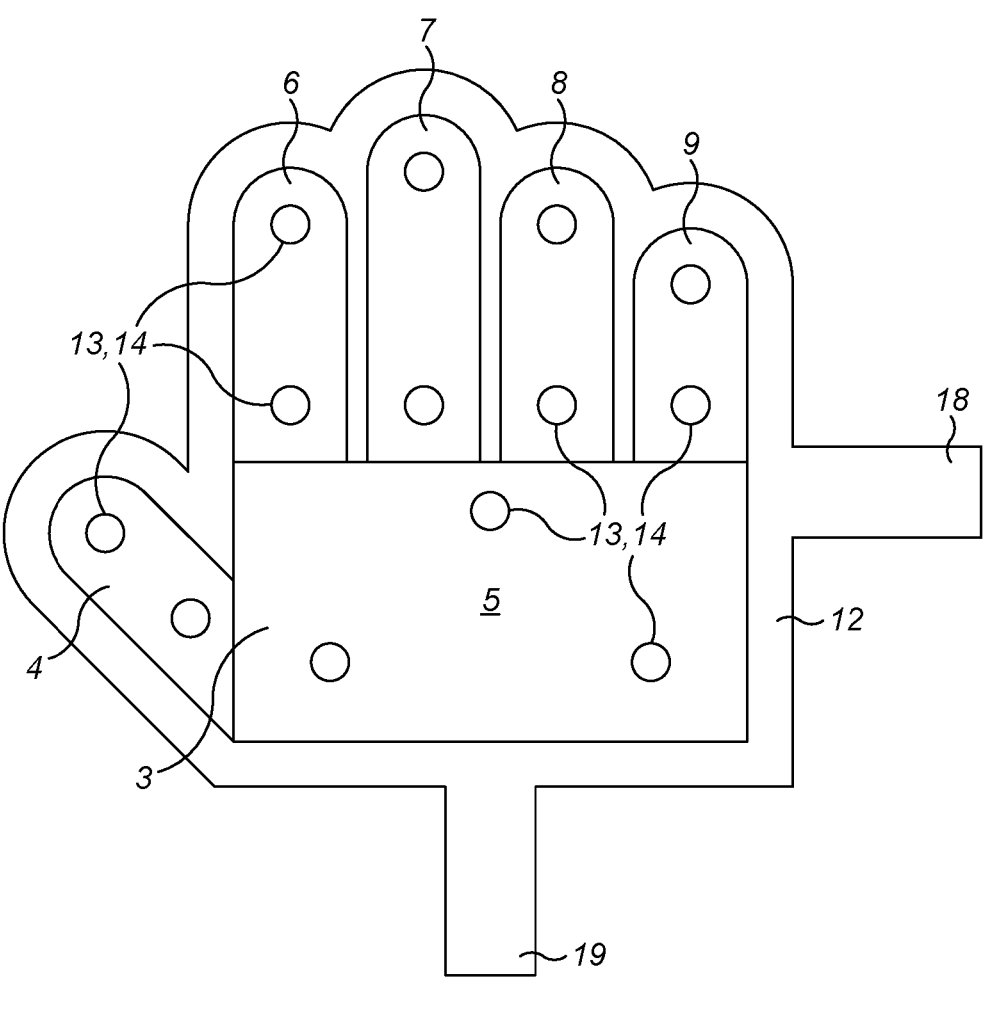
FIG. 1 is a schematic plan view of a last and a reference plate.

With the knitted body formed in a conventional manner, a last 3 is inserted into the glove body 2. The last 3 is shown in FIG. 1 in six pieces, namely a thumb piece 4, a palm piece 5 and four finger pieces 6-9 which are of varying sizes in order to accommodate the different finger sizes of the glove body 2. A thumb piece 4 and finger pieces 6-9 are inserted first followed by the palm piece 5. Alternatively the palm piece 5 and finger pieces 6-9 may be provided as a single piece. It is generally preferred to keep the thumb piece 4 separate for ease of insertion. The last 3 is sized to stretch the fabric of the glove body 2 such that it provides a crease free and generally flat rear layer 10 and front layer 11 as shown in FIG. 2.

In this stretched-flat configuration, the last 3 and glove body 2 are placed onto a reference plate 12. As shown in FIG. 1, this has a shape which generally follows the shape of the last 3. However, this can be other shapes, such as a generally rectangular shape if desired. The last 3 and reference plate 12 are preferably made from a relatively hard plastic (e.g., acrylic/PMMA) or a metal (e.g., aluminium).

In order to correctly locate the last parts 4-9 on the reference plate 12, complimentary magnetic elements 13, 14 are provided in the last 3 and reference plates 12 respectively. Spacers 15, 16 are also provided in the last 3 and reference plate 12 respectively in order to maintain the flat surfaces of the last 3 and reference plate 12. At least two pairs of magnetic elements 13, 14 are provided for each last part 4-9 at the various locations as noted by the small circles in FIG. 1 to ensure the correct alignment of components.

Figure 2:
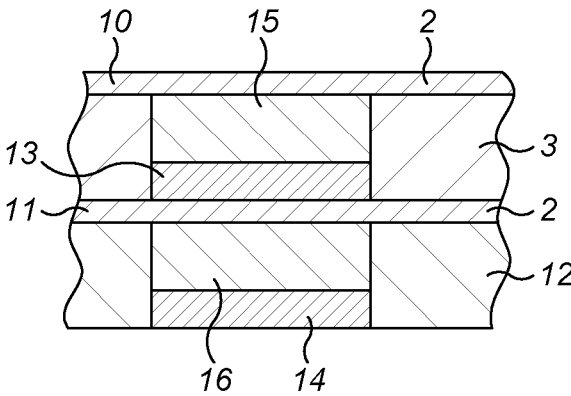
FIG. 2 is a schematic cross-section through a portion of the glove, last and reference plate prior to insertion in the 3D printer.
Figure 3:
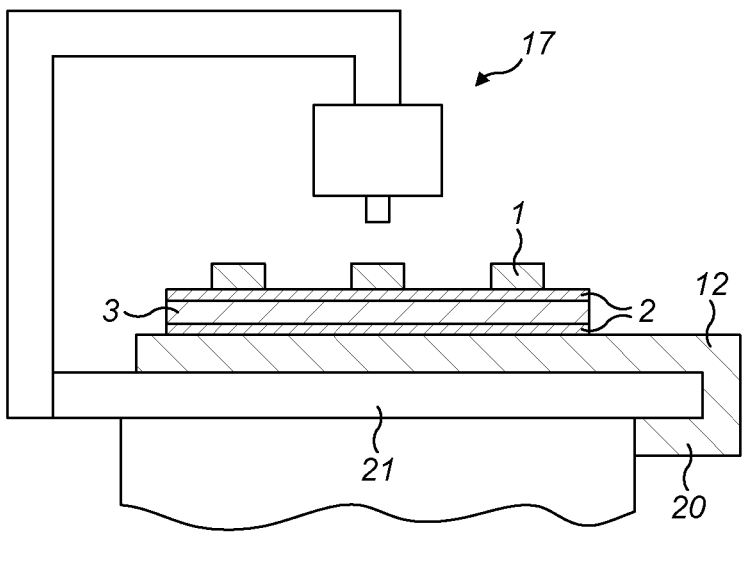
FIG. 3 is a schematic cross-section through a 3D printer showing the sub-assembly of FIG. 2 after the 3D printing process.

With the lasts 3 in place on the reference plate 12, the whole sub assembly shown in FIGS. 1 and 2 is then placed into the 3D printer 17 shown schematically in FIG. 3. The reference plate 12 is provided with a pair of tabs 18, 19 which extend in mutually orthogonal direction and have hook like structures 20 in order to locate the reference plate 12 in the X and Y directions around the edge of the print bed 21. This provides a well defined and reliably located face of the glove body 2 which is stretched flat and devoid of creases such that the protective features 1 can then be printed onto the glove body 2. The material for the protective features 1 is preferably a polymer and is preferably relatively soft (e.g., TPU).

Figure 4:
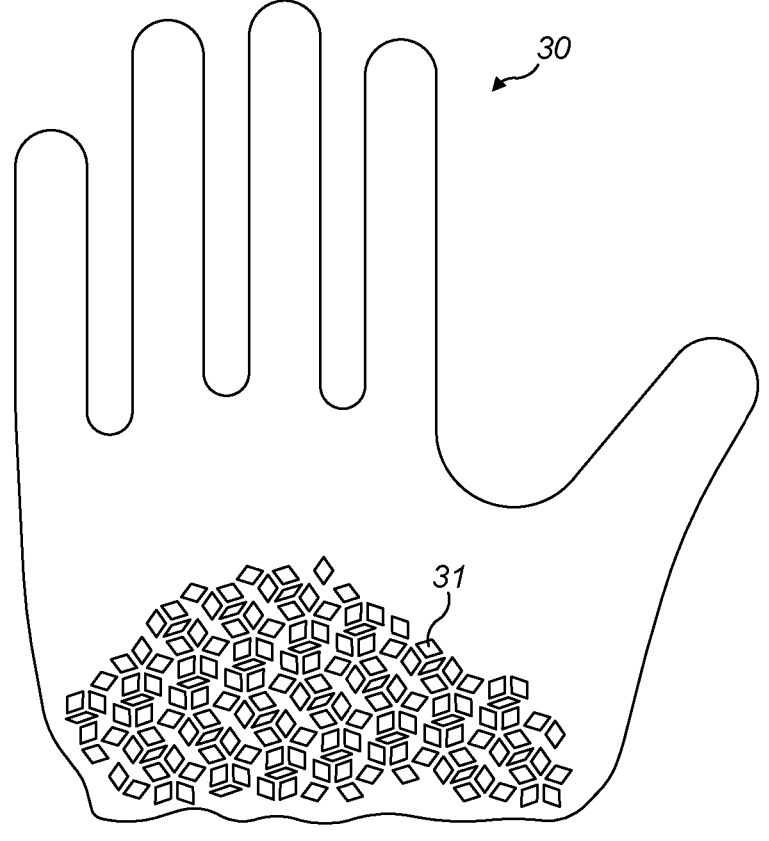
FIG. 4 is a schematic plan view of a glove on which a lattice has been 3D printed.
Figure 5:
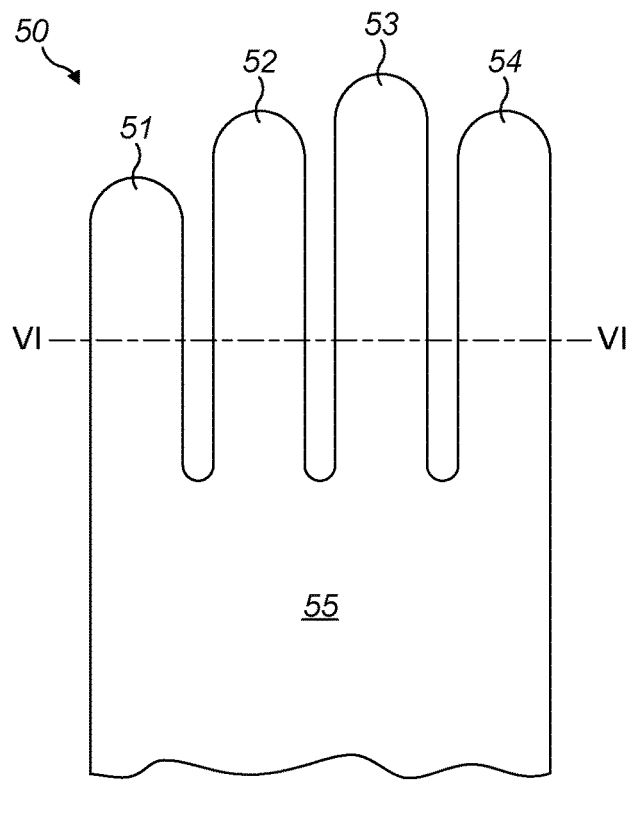
FIG. 5 is a plan view of part of a second last.
Figure 6:
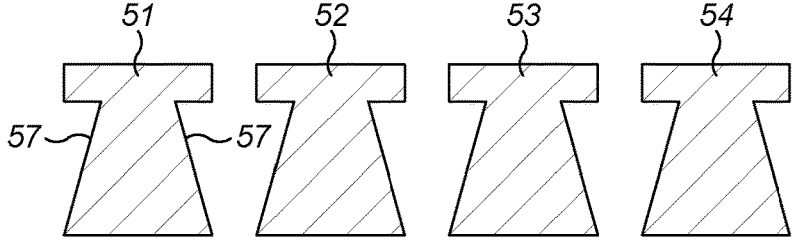
FIG. 6 is a section through line VI-VI in FIG. 5.

The nature of 3D printing together with the well-defined surface, which stretches the fabric of the glove body 2, provide for enhanced bonding and allow for the automatic formation of protective features 1 of a complexity which cannot be achieved with prior art techniques. As such, the protective features 1 can have a structure which is much more precisely defined in order to provide the optimal impact protection, flexibility and breathability Example features which may be incorporated into the protective parts, which are difficult or impossible to produce via injection moulding, may, for example, be an open or closed lattice form. Combinations of structures and adjacent gaps efficiently control shockwave propagation and energy absorption whilst being much lighter than 'solid' parts of equivalent bounding boxes. The lattice may, for example be a hexagonal lattice, or a Penrose lattice as described in our earlier GB application GB2011397.3. An example of a glove 30 with such a lattice pattern 31 is shown in FIG. 4.

A second example is shown in FIGS. 6 to 17.

In this example, the last 50 has four finger portions 51-54, a palm portion 55 and a cuff portion 56.

Figure 7:
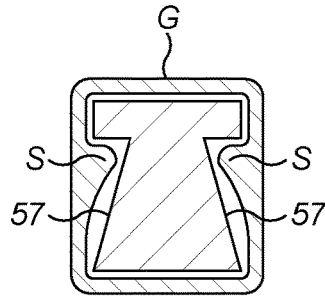
FIG. 7 shows a portion of FIG. 6 with a finger of a glove in situ.
Figure 8:
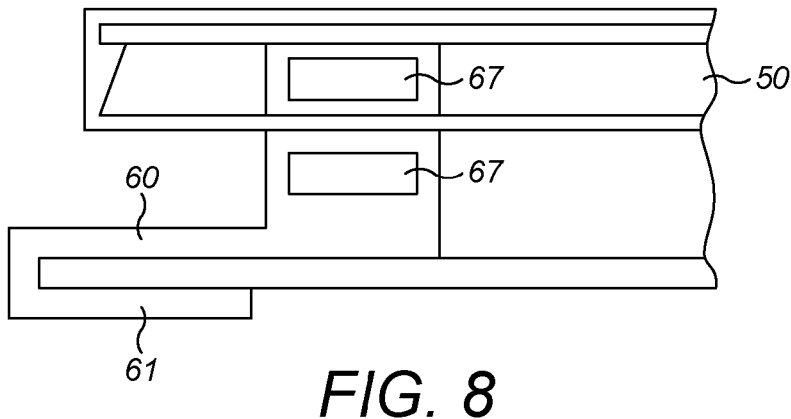
FIG. 8 is a partial cross section through part of the last of FIG. 5 and part of a reference plate showing an optional feature.
Figure 9:
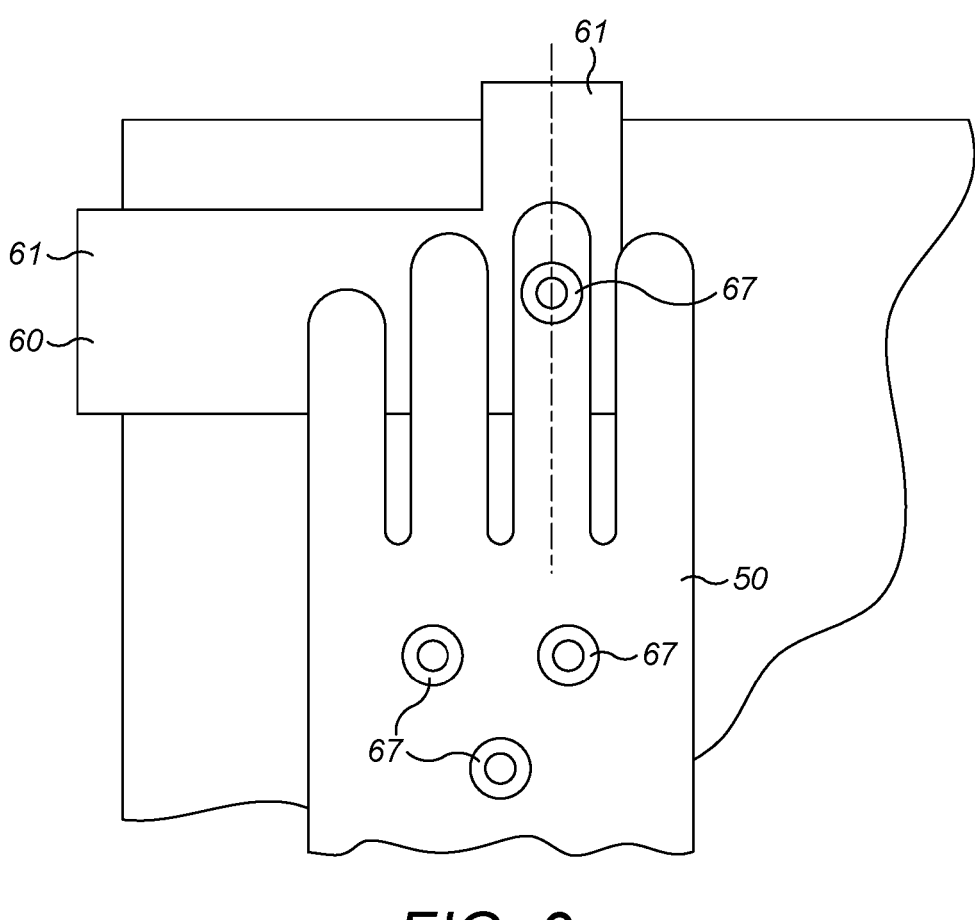
FIG. 9 is a plan view of the last of FIG. 5 and a reference plate showing an optional feature.
Figure 10:
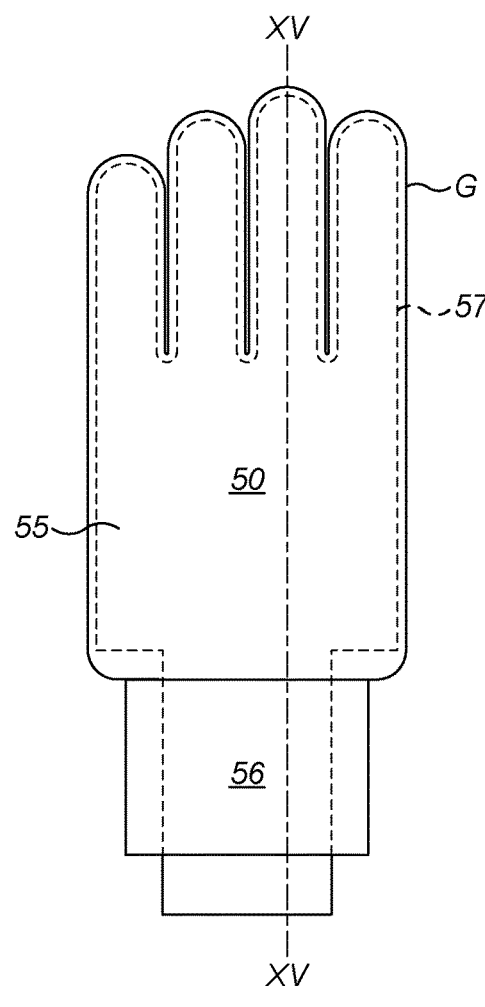
FIG. 10 is a plan view of the whole last of FIG. 5 with the glove in situ.
Figure 11:
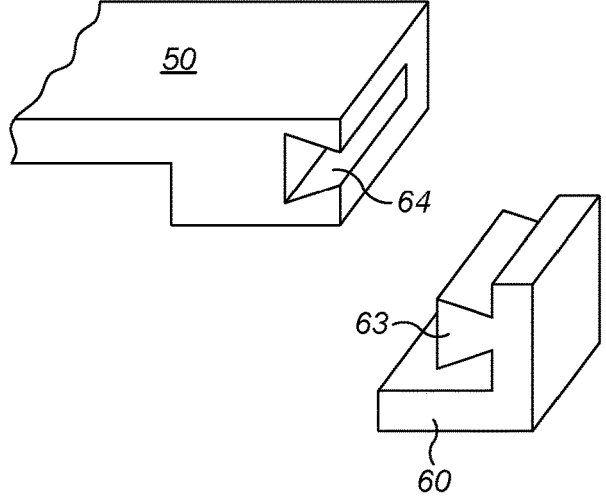

A peripheral groove 57 runs around the periphery of the last, including along both sides of the finger portions 51-54. The profile of the grooves 57 is best shown in FIGS. 6, 7, 15A and 15B. The groove accommodates the seam S of glove G so that the glove lies flat across the top of the last 50 as shown in FIG. 7.

The manner in which the last 50 is attached to the print bed 21 is shown in FIGS. 11 to 14, 16 and 17.

Figures 12, 13:
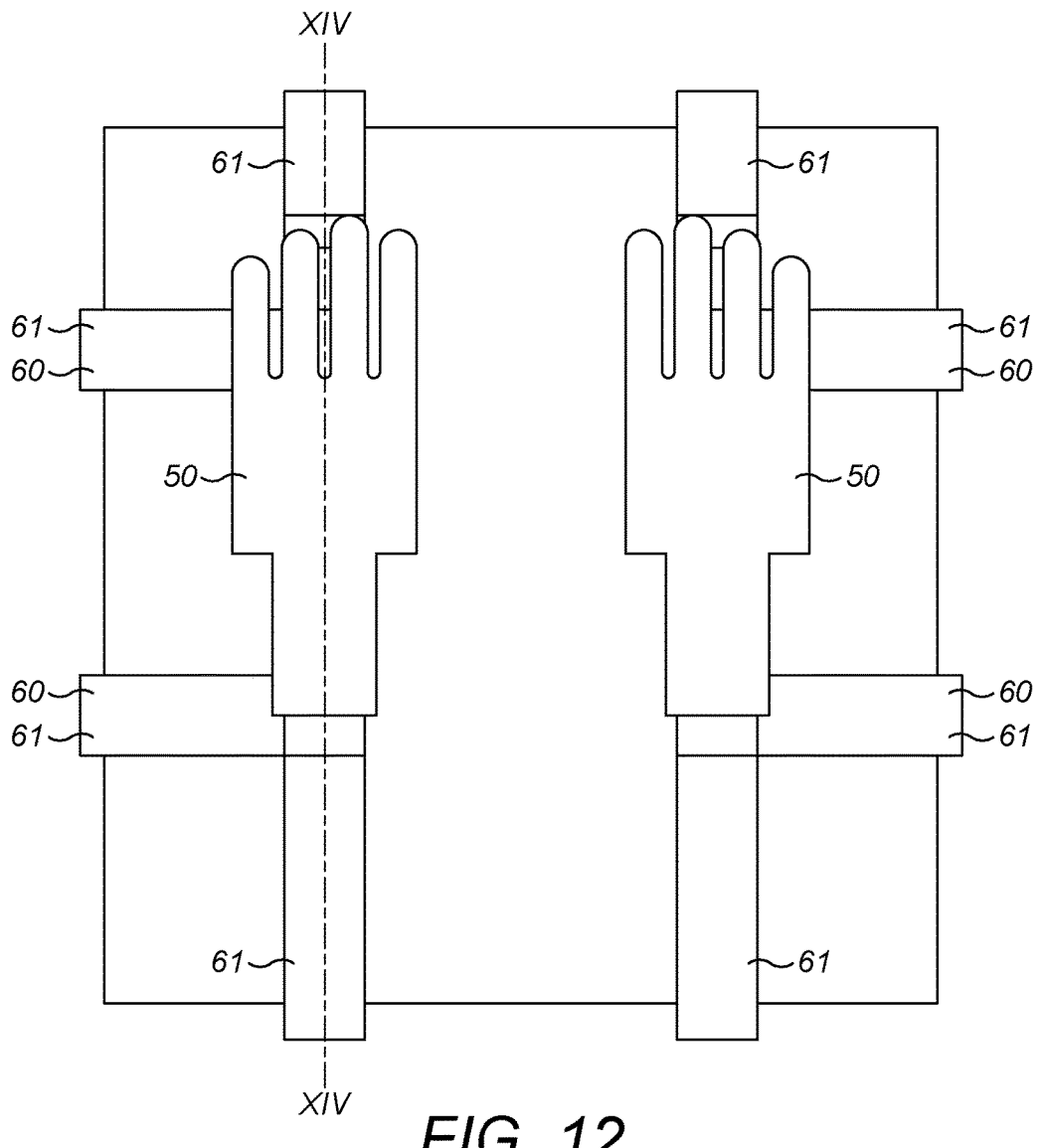
FIG. 12 is a plan view of a 3D printer with two lasts of FIG. 5 and four reference plates.
FIG. 13 is a cross sectional view showing the clamping of a reference plate to the printer bed.
Figure 14:
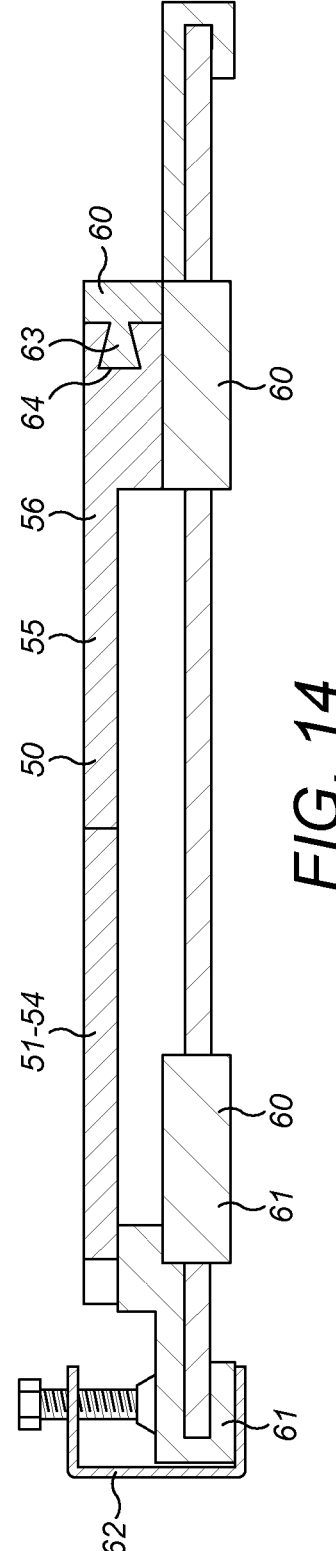
FIG. 14 is a schematic cross section through line XIV-XIV in FIG. 11.
Figure 15A:
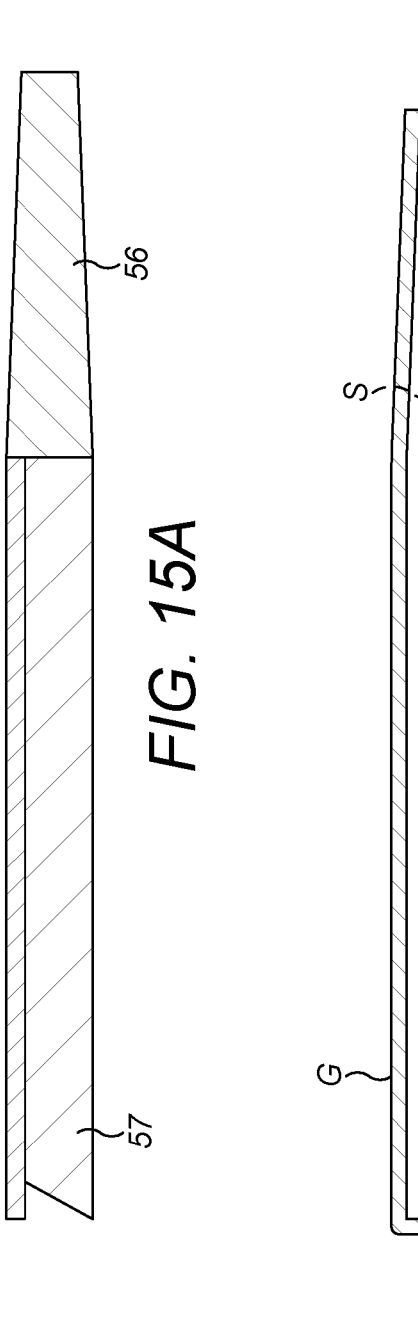
FIG. 15A is a cross section through line XV-XV in FIG. 10 without the glove in situ.
Figure 15B:
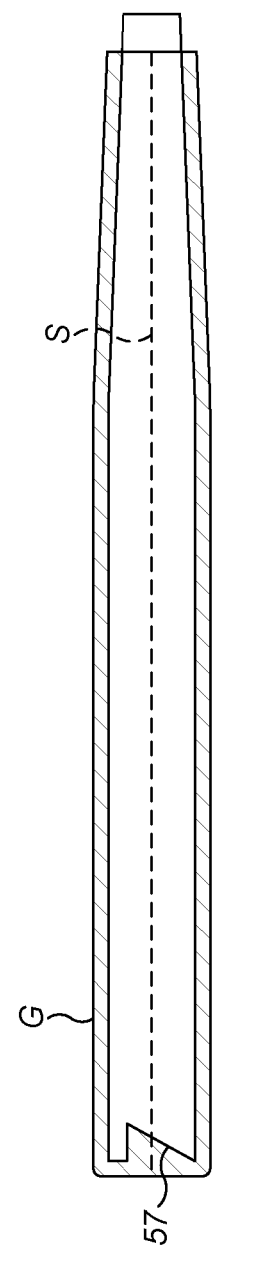
FIG. 15B is a cross section through line XV-XV in FIG. 10.
Figure 16:
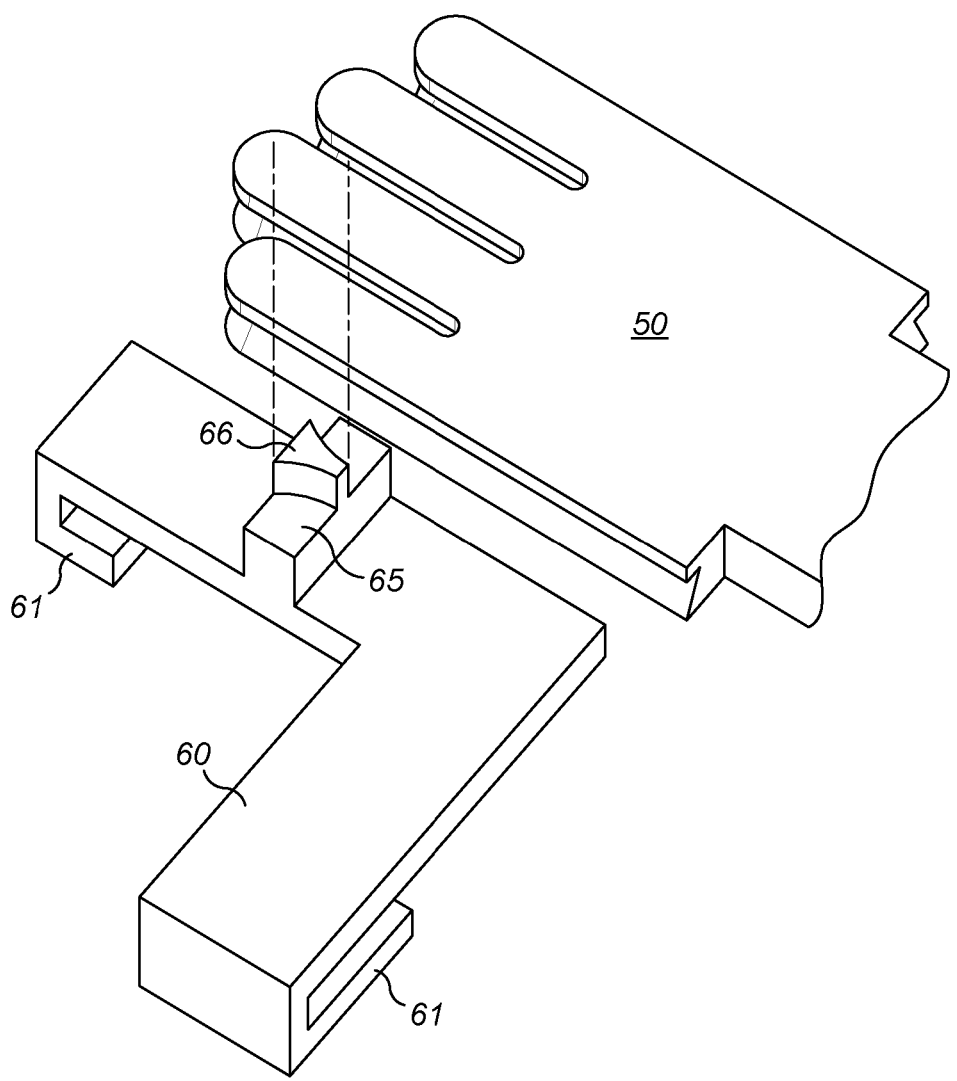
FIG. 16 is an exploded perspective of the last of FIG. 5 and part of a reference plate showing an engaging feature.

Each last 50 is attached to a pair of reference plates 60. Each reference plate 60 has an L shaped configuration which is engageable with orthogonal edges of the print bed as shown in FIG. 12. The ends of the plates have hooks 61 which hook over the edges of the print bed 21. Clamps 62 are provided to secure the reference plate 60 in place. There may be one clamp per hook 61, or only one clamp 62 per plate 60 may be necessary.

The part of the reference plate 60 which supports the cuff portion 54 has a dovetail projection 63 to engage with a complimentary dovetail recess 64 in the end of the last 50. The positions of projection 63 and recess 64 can be reversed.

The part of the reference plate 60 which supports the finger portions 51-54 has an upstanding boss 65 to support the finger portions and an engagement projection 66 (see FIG. 16) which fits between adjacent finger portions 51-54 to prevent lateral movement of the last 50 at this end.

In use, the reference plates 60 are fixed in place on the print bed 21 by clamps 62. A glove G is placed onto the last 50 and manipulated into place until a flat surface is achieved on the upper face of the last. The last is then fitted to the reference plates 60 by engaging the dovetail joint 63, 64 which anchors the cuff end. The fingers 51-54 are supported on the upstanding boss 65 and fitted on the engagement projection 66 to prevent lateral movement.

This may be sufficient to hold the glove G firmly enough for the 3D printing process, Optional magnets 67 (see FIGS. 8 and 9) may be provided as in the previous example to give a more secure connection.

When the 3D printing is completed, the end of the last 50 with the fingers 51-54 is lifted from the engagement projection 66 and last 50 is slid off the plate 60 disengaging the dovetail joint 63, 64. The glove is then removed.

Figure 17:
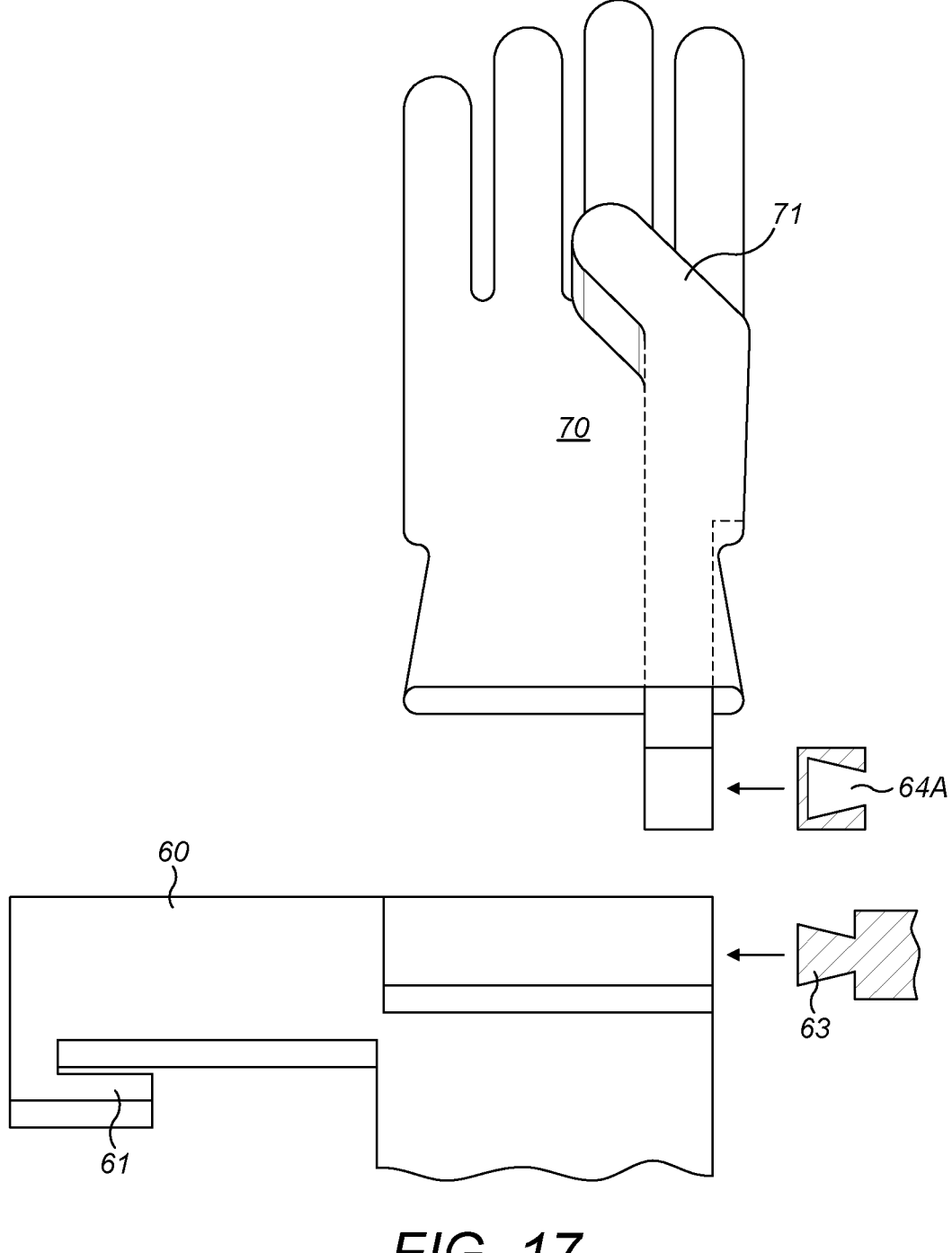
FIG. 17 is an exploded perspective view of an alternative last and part of a reference plate showing an engaging feature.

If additional printing of the thumb is required, a second last 70 with a thumb portion 71 shown in FIG. 17 is inserted into the glove. The second last 70 is attached to the reference plates 60 as described above. The second last has the same dovetail recess 64A which engages with the dovetail projection 63 as before and the opposite end of the second last 70 is supported in the same way by boss 65 by engagement projection 66.

The invention claimed is:

1. A method for making a protective glove, the method comprising forming a glove body from flexible material, the glove body comprising a front layer and a rear layer with an opening between the layers to allow access for the hand into an internal space within the glove;

inserting a last into the glove body to stretch the glove body and to hold the rear layer in the stretched form without creases, wherein the last has a peripheral face extending, in use, between the front and rear layers of the glove, the peripheral face having a groove to receive, in use, a seam on the glove;

placing the glove and last on a 3D printer bed; and 3D printing protection features onto the rear layer.

2. The method according to claim 1, wherein a reference plate is provided, the reference plate being configured to receive the last in a predetermined position, the reference plate having with at least one stop feature to locate the reference plate on the 3D printer print bed.

3. The method according to claim 2, wherein the last is provided with a plurality of mechanically interlocking features which are complimentary to mechanically interlocking features on the reference plate in order to locate the last on the reference plate.

4. The method according to claim 2 wherein the last is provided with a plurality of magnetic features which are complimentary to magnetic features on the reference plate in order to locate the last on the reference plate.

5. The method according to claim 1, wherein the last is provided in at least two parts.

6. The method according to claim 5, wherein the parts include a thumb part insertable into a thumb portion of the glove body and a main part insertable into finger and palm portions of the glove body.

* * * * *